(12) United States Patent
Miyoshi et al.

(10) Patent No.: US 10,997,127 B2
(45) Date of Patent: May 4, 2021

(54) PREVENTING INEFFICIENT RECALLS IN A HIERARCHICAL STORAGE MANAGEMENT (HSM) SYSTEM

(71) Applicant: INTERNATIONAL BUSINESS MACHINES CORPORATION, Armonk, NY (US)

(72) Inventors: Hiroyuki Miyoshi, Kawasaki (JP); Hiroshi Araki, Yokohama (JP); Katsuyoshi Katori, Tamaku Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 313 days.

(21) Appl. No.: 16/039,113

(22) Filed: Jul. 18, 2018

(65) Prior Publication Data

US 2020/0026784 A1 Jan. 23, 2020

(51) Int. Cl.
| | |
|---|---|
| G06F 16/185 | (2019.01) |
| G06F 16/178 | (2019.01) |
| G06F 16/182 | (2019.01) |
| G06F 16/17 | (2019.01) |
| G06F 16/174 | (2019.01) |

(52) U.S. Cl.
CPC .......... *G06F 16/185* (2019.01); *G06F 16/178* (2019.01); *G06F 16/1734* (2019.01); *G06F 16/1744* (2019.01); *G06F 16/183* (2019.01)

(58) Field of Classification Search
CPC .. G06F 16/185; G06F 16/183; G06F 16/1744; G06F 16/178; G06F 16/1734

USPC ........................................................ 707/609
See application file for complete search history.

(56) References Cited

U.S. PATENT DOCUMENTS

| | | | |
|---|---|---|---|
| 6,269,382 B1* | 7/2001 | Cabrera | G06F 16/122 |
| 8,316,182 B2 | 11/2012 | Augenstein et al. | |
| 9,213,721 B1* | 12/2015 | Faibish | G06F 16/185 |
| 9,596,291 B1* | 3/2017 | Basva | G06F 3/0685 |
| 2004/0049513 A1 | 3/2004 | Yakir et al. | |
| 2005/0015409 A1 | 1/2005 | Cheng et al. | |
| 2007/0179990 A1* | 8/2007 | Zimran | G06F 16/125 |
| 2011/0040937 A1* | 2/2011 | Augenstein | G06F 3/0634 |
| | | | 711/117 |

(Continued)

OTHER PUBLICATIONS

"Hierarchical Storage Management," http://www.wow.com/wiki/Hierarchical_storage_management, 2017 (3 pages).

*Primary Examiner* — Joshua Bullock
(74) *Attorney, Agent, or Firm* — Griffiths & Seaton PLLC (57) ABSTRACT

A system and method for preventing inefficient recalls in a hierarchical storage management (HSM) system are presented. Difference data may be received for updating a target file stored in a first storage system having at least an upper storage layer and a lower tape layer. The difference data may be stored in a stub file located on the upper storage layer and corresponding to the target file in the first storage system located on the lower tape layer. A recall operation may be executed that copies the target file from the lower tape layer to the upper storage layer. The difference data stored in the stub file may be copied to the target file copied onto the upper storage layer from the lower tape layer according to one or more predetermined events.

17 Claims, 6 Drawing Sheets

(56) References Cited

U.S. PATENT DOCUMENTS

| | | | |
|---|---|---|---|
| 2011/0246416 A1* | 10/2011 | Prahlad | G06F 16/1734 |
| | | | 707/610 |
| 2011/0246429 A1* | 10/2011 | Prahlad | G06F 11/1471 |
| | | | 707/679 |
| 2012/0150799 A1* | 6/2012 | Matsuzawa | G06F 16/185 |
| | | | 707/622 |
| 2017/0046351 A1* | 2/2017 | Hasegawa | G06F 16/119 |
| 2018/0018089 A1* | 1/2018 | Araki | G06F 3/0647 |

* cited by examiner

PREVENTING INEFFICIENT RECALLS IN A HIERARCHICAL STORAGE MANAGEMENT (HSM) SYSTEM

BACKGROUND OF THE INVENTION

Field of the Invention

The present invention relates in general to computing systems, and more particularly to, various embodiments for preventing inefficient recalls in a hierarchical storage management (HSM) system by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. For example, processing devices, with the advent and further miniaturization of integrated circuits, have made it possible to be integrated into a wide variety of devices for personal, business, health, home, education, scientific, or governmental related areas of interest.

SUMMARY OF THE INVENTION

Various embodiments for preventing inefficient recalls in a hierarchical storage management (HSM) system using one or more processors are provided. In one embodiment, by way of example only, a method for preventing inefficient recalls in an HSM system, again by a processor, is provided. Difference data may be received for updating a target file stored in a first storage system having at least an upper storage layer and a lower tape layer. The difference data may be stored in a stub file located on the upper storage layer and corresponding to the target file in the first storage system located on the lower tape layer. A recall operation may be executed that copies the target file from the lower tape layer to the upper storage layer. The difference data stored in the stub file may be copied to the target file copied onto the upper storage layer from the lower tape layer according to one or more predetermined events.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Hierarchical Storage Management ("HSM") is a data storage technique which automatically moves data between a primary and a secondary storage tier. HSM may also be referred to as tiered storage. In HSM systems, data files that are frequently used are stored on high-speed storage devices of the primary storage tier, such as flash drives or hard disk drive ("HDD") arrays. They are more expensive per byte stored than slower devices of the secondary storage tier, such as optical discs and magnetic tape drives. In short, HSM systems such as, for example, IBM® Spectrum Archive, executes transparent placement of frequently accessed data to fast Flash/HDD media and less frequently accessed data to tapes so as to reduce the total cost of ownership ("TCO").

In one aspect, a migration is to move data from flash drives or hard disk drive ("HDD") to tape device storage. A recall may be a transfer (e.g., move) of data from tape to Flash storage and/or HDD. As such, an HSM system may migrate data files from the primary disk drives to the secondary tape drives such as, for example, if they have not been used for a certain period of time, typically a few months. This data migration frees expensive disk space on the primary storage devices. If an application does reuse a file, which is on a secondary storage device, the data (e.g., file) is automatically recalled, that is, moved back to the primary disk storage. Due to this transparent file recall capability, the file remains accessible from a client application although it has been physically migrated to the secondary storage.

During a recall operation, the recall needs to locate the tape cartridge, load the tape cartridge to a tape drive, and seek the data (e.g., file) within the tape cartridge. The overhead may be in the order of minutes and is relatively slow compared to the flash storage and/or HDD. This is particularly true if there are multiple files saved in multiple tapes. The load and seek may occur many times and make the read extremely slow.

Thus, in an ideal situation, data is stored and is available on high-speed devices at all times. However, this may be prohibitively expensive for many entities/enterprises. Instead, HSM systems store the bulk of the enterprise's data on slower-speed storage devices and then copy data to higher-speed disk drives when needed. In effect, HSM turns the fast disk drives into caches for the slower-speed mass storage devices. The HSM system monitors the way data is used and determines which data can safely be moved to slower-speed devices and which data should stay on the higher-speed devices.

Accordingly, the present invention provides for an HSM system such as, for example, IBM® Spectrum Protect® and IBM® Spectrum Archive®, and the HSM system may support an operational feature called optimized recall (or "selective recall"). For example, an HSM storage system may include tapes storage devices (e.g. IBM® Spectrum Archive®). An optimized recall accepts a read of multiple files at once and changes the file order so that the number of load/seek is minimized. Furthermore, an HSM system such as, for example, IBM® Spectrum Scale® may support a feature called active file management (AFM).

AFM is a scalable, high-performance, file system caching layer integrated with a General Parallel File System ("GPFS") cluster file system. AFM allows to create associations from a local GPFS cluster to a remote cluster or storage, and to define the location and flow of file data to automate the management of the data. This allows for implementing a single namespace view across globally located sites. AFM masks wide-area network latencies and outages by using GPFS to cache massive data sets, allowing data access and modifications even when a remote storage cluster is unavailable. In addition, AFM performs updates to the remote cluster asynchronously, which allows applications to continue operating while not being constrained by limited outgoing network bandwidth. However, application such as, for example, AFM may issue too many write request to multiple migrated files within a short period.

Accordingly, various embodiments are provided herein for preventing inefficient recalls in an HSM system, again by a processor, is provided. Difference data may be received for updating a target file stored in a first storage system having at least an upper storage layer and a lower tape layer. The difference data may be stored in a stub file located on the upper storage layer and corresponding to the target file in the first storage system located on the lower tape layer. A recall operation may be executed that copies the target file from the lower tape layer to the upper storage layer. The difference data stored in the stub file may be copied to the target file copied onto the upper storage layer from the lower tape layer according to one or more predetermined events.

It should be noted that a stub file may be a computer file which appears to a user on a disk and is immediately available for use. The stub file is actually held either in part or entirely on a different storage medium. Upon accessing a stub file, the accessed file is intercepted by a device driver application, the data is retrieved from the actual location of the stub file, the retrieved data is written to the stub file, and user access is allowed.

In one aspect, a first storage system (e.g., an HSM system) may be used that conforms to a predetermined file system. The first storage system may be an HSM system containing at least an upper storage layer (e.g., a flash drives or HDD) and a lower tape layer (e.g., a tape). Difference data may be received, by the first storage system, for updating a file to be updated (e.g., a target file), which may be stored in the first storage system. When the target file does not exist on the upper storage layer (e.g., a flash drives or HDD), but exists on the lower tape layer in the first storage system, the difference data may be stored in a stub file that exists on the upper storage layer (e.g., a flash drives or HDD) and corresponds to the file. In response to an occurrence of one or more predetermined events, a recall processing operation may be executed that copies the file from the lower tape layer to the upper storage layer (e.g., a flash drives or HDD) and executes an updating processing to the copied file using the difference data stored in the stub file.

In an additional aspect, a second storage system (e.g., a production site in disaster recovery solution, a satellite site in multi-storage configuration, etc.) connected to the first storage system via a network may be used. The first storage system may be a logical replica of the second storage system. The second storage system may send the difference data to the first storage system in response to a first file on the second storage system having been updated. The file to be updated corresponds to the first file. In one aspect, a first storage system may be AFM Home with HSM and the "second storage system" is the AFM Cache. A "first storage system may also be storage system having IBM® Spectrum Scale® and IBM® Spectrum Archive (HSM), configured as active file management (AFM) Home (as described herein). Also, the first storage system may be a (disaster recovery) backup replica storage with tapes, or home storage site having one or more tapes that has all the files in a multi-site storage solution (e.g., one or more satellite site and a home site). A "second storage system" may be a storage system having IBM® Spectrum Scale® configured as an AFM Cache. Also, the second storage system may also be a (disaster recovery) production storage, or a satellite storage site in the multi-site storage solution (e.g., one or more satellite sites and a home site). The satellite storage may be a partial cache of the home storage. In one aspect, the first storage system may be a production storage system and the second storage system may be a backup/home storage system.

In the first storage system, when a file does not exist on the upper storage layer, but is present/stored on the lower tape layer, a first attribute (e.g., a migrate attribute) may be assigned to the file. In response to difference data having been saved in a stub file corresponding to the file, a second attribute (e.g., a migrated-dirty attribute) may be assigned to the file. In response to completion of an update processing on the file using the difference data, a third attribute (e.g., a resident attribute) may be assigned to the file. It should be noted that the a write operation ("write ( ):)" completes with migrated-dirty thereby becoming increasingly faster as opposed to other writes.

The predetermined events may include, for example: (1) when an amount of difference data saved in a stub file exceeds a predetermined amount, and (2) when a total number of files, difference data of each of which is stored in a stub file, exceeds a predetermined number. A recall process and execution may include executing the recall process on a plurality of files en bloc.

It should be noted, as a preliminary matter, that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
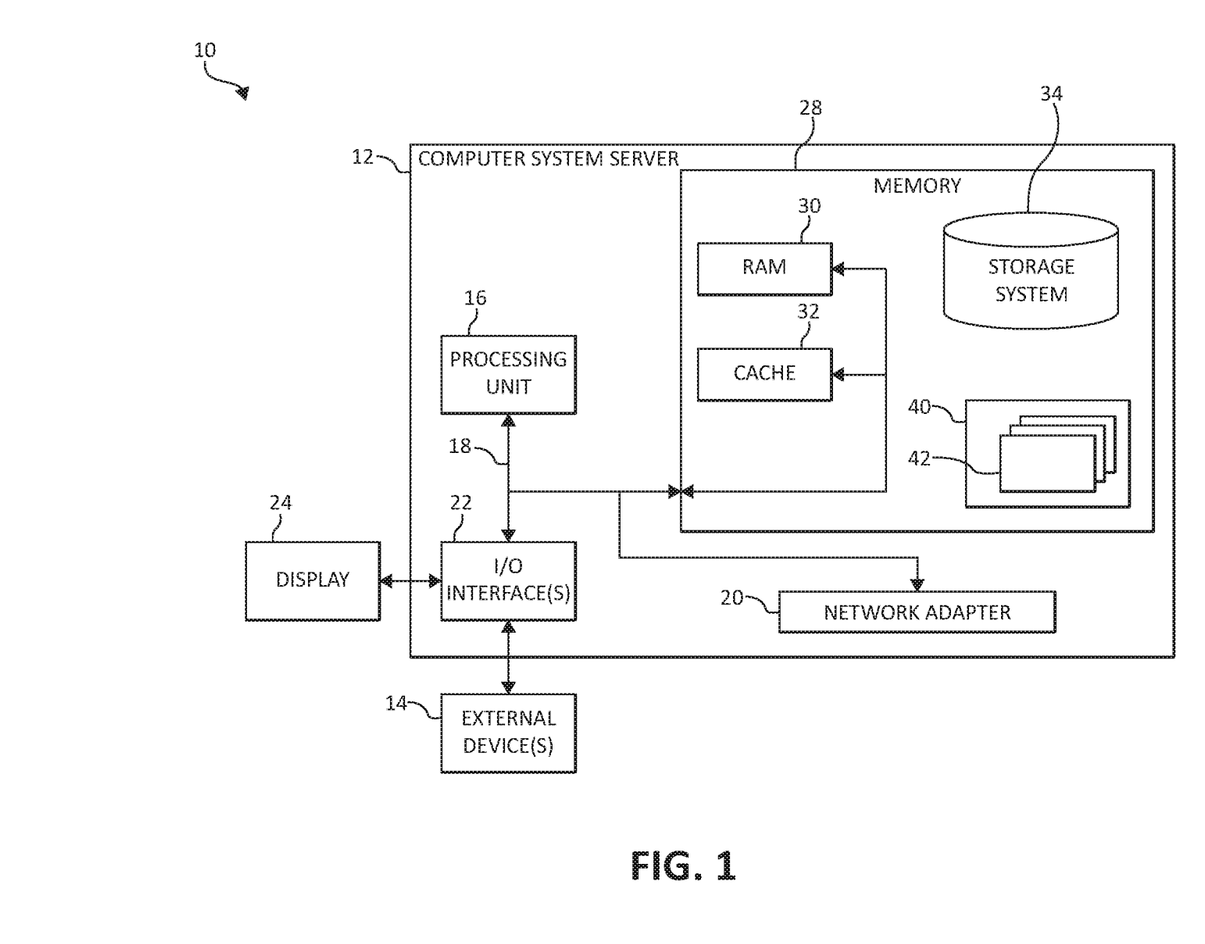
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
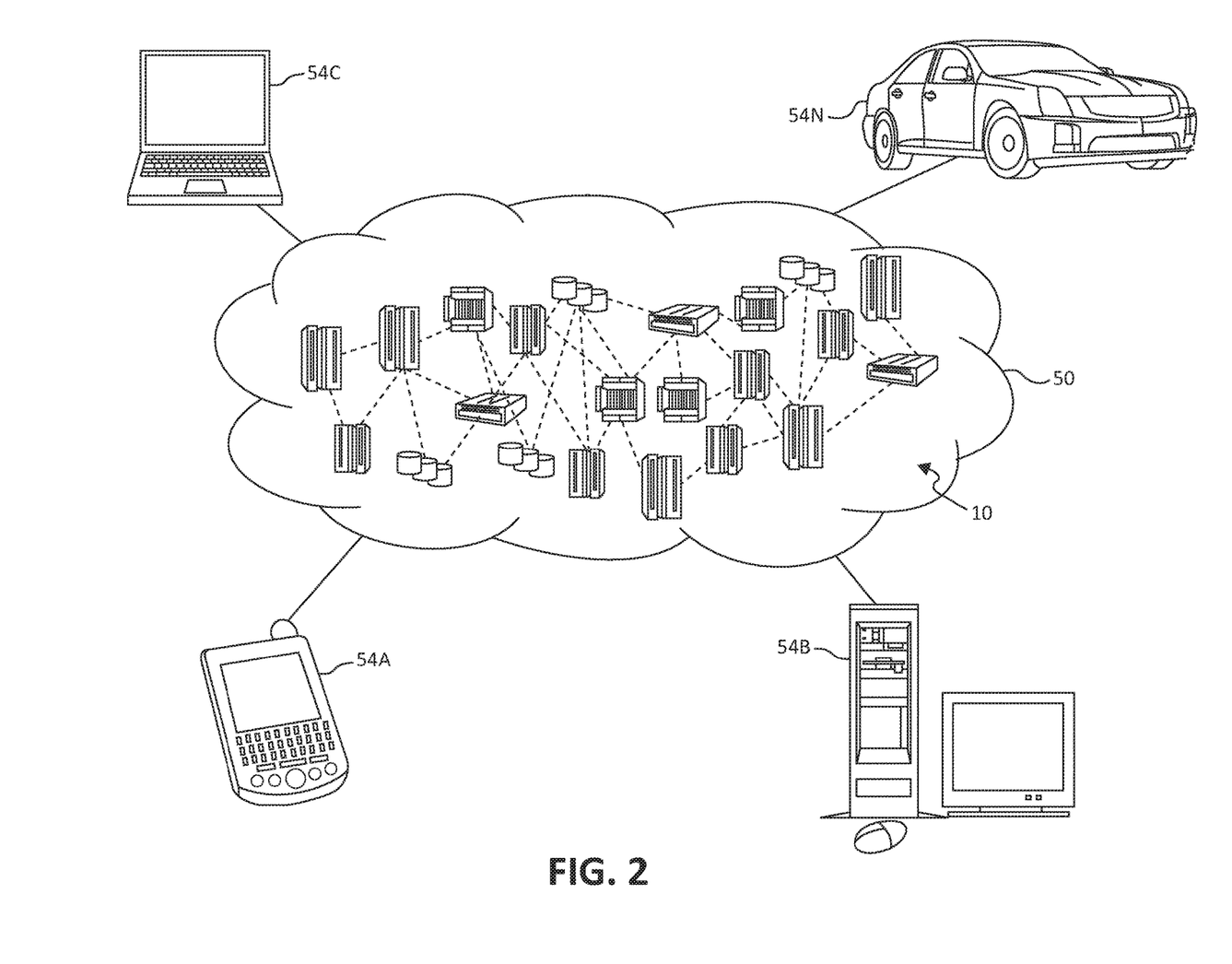
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
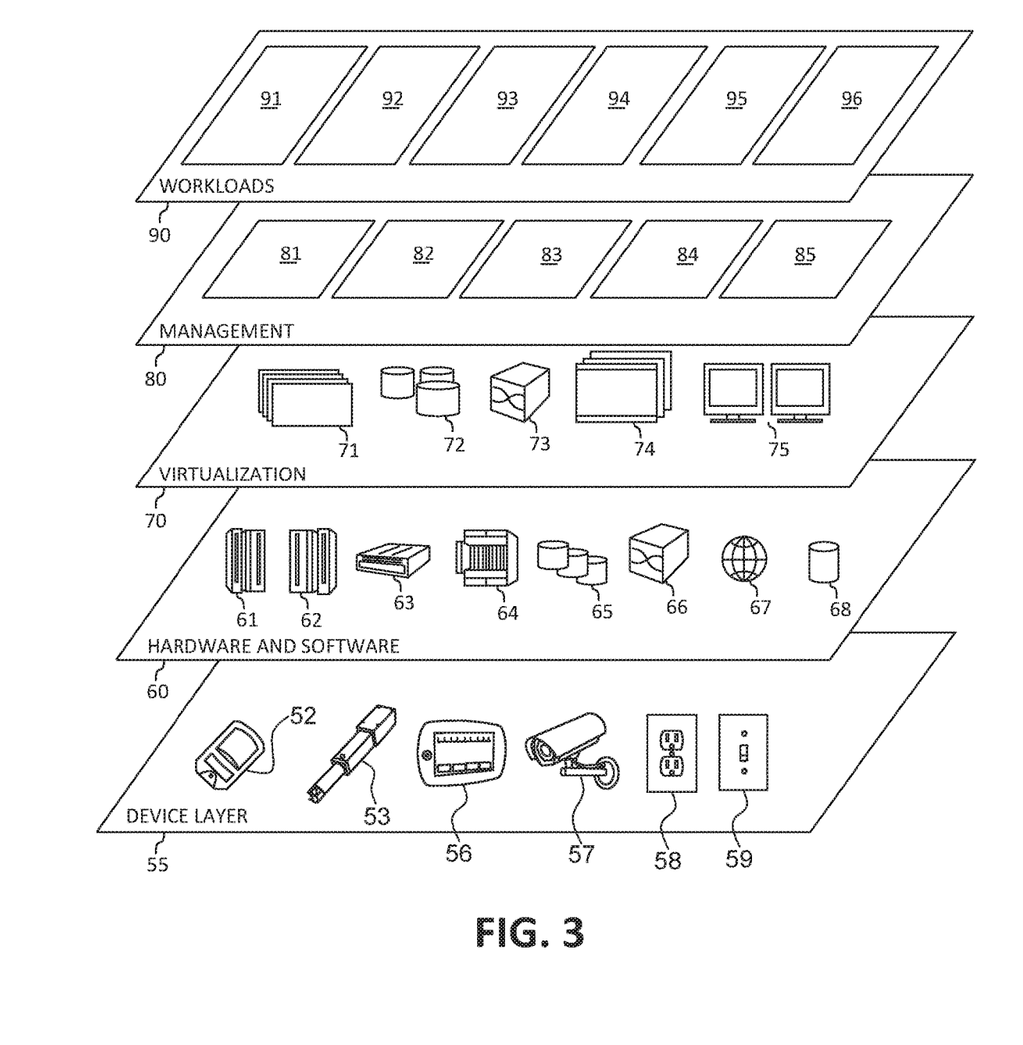
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for preventing inefficient recalls in an HSM system. In addition, workloads and functions 96 for preventing inefficient recalls in an HSM system may include such operations as data analytics, data analysis, and as will be further described, notification functionality. One of ordinary skill in the art will appreciate that the workloads and functions 96 for preventing inefficient recalls in an HSM system may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
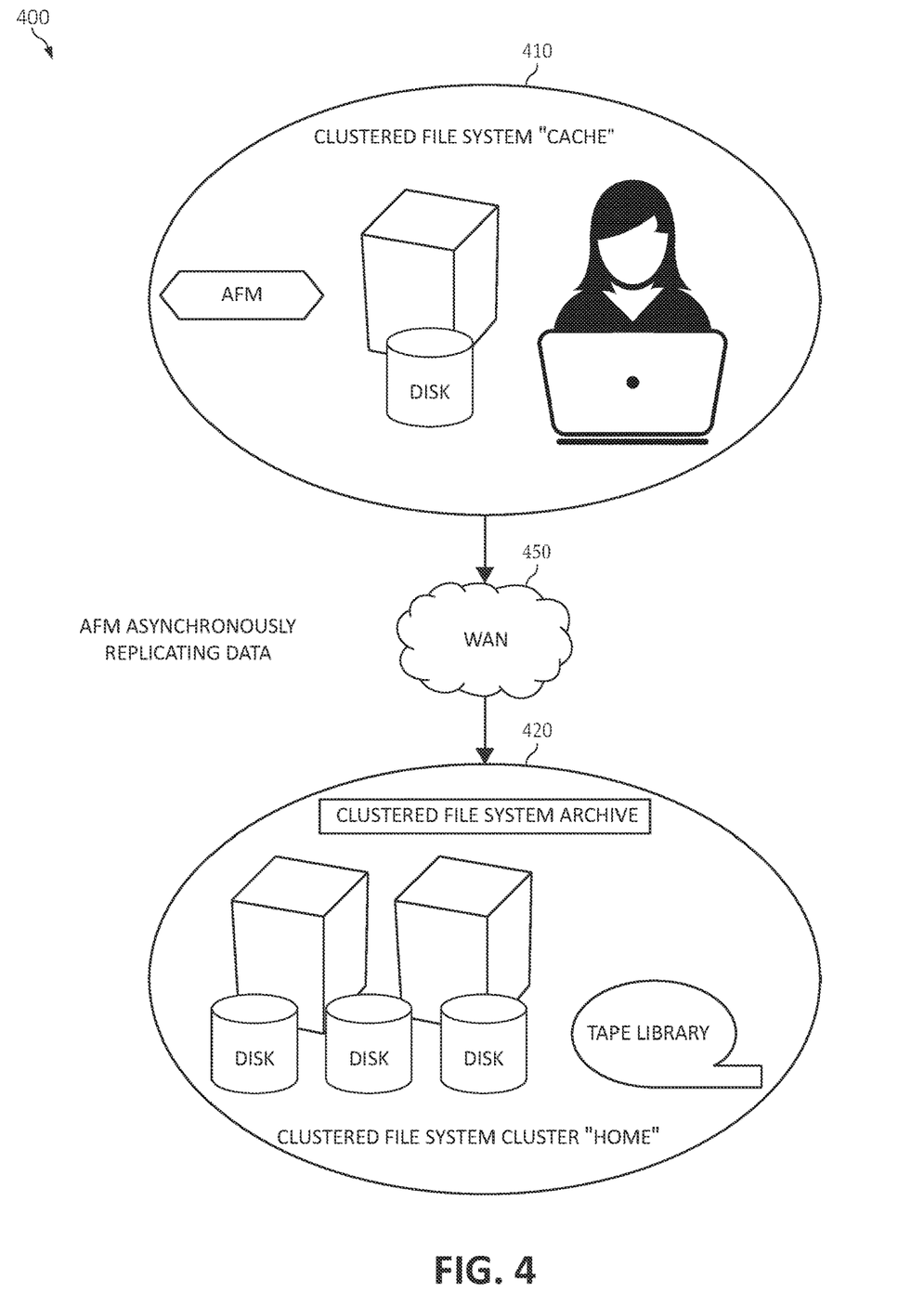
FIG. 4 is an additional block diagram depicting operations of an active file management (AFM) system according to various aspects of the present invention.

Turning now to FIG. 4, a block flow diagram of an operation of an active file management (AFM) system 400 is depicted. As will be seen, many of the functional blocks may also be considered "modules" of functionality, in the same descriptive sense as has been previously described in FIGS. 1-3. Many of the functional blocks of AFM system 400 may execute as background processes on various components, either in distributed computing components, or on the user device, or elsewhere, and generally unaware to the user performing generalized tasks of the present invention. Also, one or more aspects of FIGS. 1-3 may also be included with and/or implemented with FIG. 4.

As illustrated, the AFM system 400 enables two sites (hereinafter referred to as "cache" and "home"), in each of which an HSM system has been installed, to allow cache 410 to access files of home 420. That is, the cache 410 (e.g., IBM® Spectrum Scale®) may be a clustered file system "CFS" operating as a cache site. The home 420 (e.g., IBM Spectrum Archive®) may be a CFS archive operate having one or more disks and a tape library (e.g., IBM Spectrum Archive®).

Unlike creating a network attached storage ("NAS") system to share home's 420 files (e.g., files of the disks), the cache 410 maintains copies of home's 420 files as a cache to minimize impact of the latency of the network 450 (e.g., a wide area network) between the cache 410 and the home 420. When a file is edited and updated in cache 410, the cache 410 saves the difference data (e.g., the delta or "changed" data) in an AFM specific format, and sends the difference data to the home 420 in a certain period of time (e.g., in the order of seconds). Because the AFM system 400 periodically sends changes made to a file in the cache 410 to the home 420 as difference data, the AFM system 400 may also be used for data replication as well as for remote sharing.

More specifically, the home 420 may include a tape library (e.g., IBM Spectrum Archive®) that provides an HSM feature using a tape, and a GPFS file system, of the tape library, may operate or function as a front end. A user may store a file first in a GPFS constructed on a high-speed storage medium device such as, for example, on a primary storage tier, such as flash drives or HDD storage devices.

When a migrate command is executed on a file in the GPFS, the file may be replaced with a small stub file and the body of the original file may be saved in a tape (e.g., saved in a lineal tape file "LTFS" file system). One or more attributes and extended attributes of the file may remain the same in the file even after the file is replaced with the stub file. From the viewpoint of the user, the file appears to exist on a GPFS without alteration. When the user executes a read operation on the migrated file, the data of the file may be recalled from the tape in the tape library to the GPFS, and returned to the user. When the user executes a write operation on the migrated file, the data of the file is recalled from the tape to the GPFS, and the write operation is performed on the GPFS. In HSM, the following states (three states) are defined for a file: 1) a migrated state where data exists on a tape only, 2) a pre-migrated state where data exists on both a tape and a Flash/HDD storage device (GPFS), and/or 3) a resident state where data exists on a Flash/HDD storage device (GPFS) only.

From the perspective of an application, whether or not an HSM feature is implemented in a file system, the applications may use a file system in the same manner. That is, applications may use a file system in the same manner regardless of whether an HSM is enabled or disabled. In other words, applications are unaware of any tape being attached. From the perspective of the AFM system 400, whether a GPFS is constructed on an HDD/Flash storage device only or the GPFS is stored in a state in which HSM is enabled to use an HDD/Flash storage device and a tape, the AFM system 400 may execute read/write operations in the same manner. The AFM 400 is not required to be aware of the configuration of the GPFS.

However, upon occurrence of a recall operation, the HSM may need to find the target tape, load the data on a tape drive, and perform a seek operation. This may incur overhead in the order of minutes, leading to extremely slow performance of a read operation. When an application performs an operation that induces recall operations on respective files distributed on tapes in the tape library, a significant delay may occur that is much longer than the expected time by the application.

When an update occurs in a file (e.g., a file in a disk) in cache 410, the AFM system 410 may semi-synchronously send difference to home 410. That is, from a host I/O point of view, the "update" on a cache (write on cache) may be requested by the host (e.g., or customer). The host I/O completion is returned and within a short time, the delta is sent to home. Next, the home 410 may read the file and apply the difference data to the read files. In this situation, if the file is migrated at home 410, the home 410 performs a recall operation.

Even when a plurality of files are updated, a recall operation and a data difference application are performed on each of the updated files. Even if the plurality of files are stored in just two tapes, depending on the order of the file updates, each recall operation can involve loading the other tape to a tape drive every time in a worst case scenario, resulting in inefficient operations. From the perspective of the AFM, the storage of home 420 appears to be extremely slow. When the user continuously updates files in cache 410, the semi-synchronization is delayed further, leading to an AFM error in some cases.

In one aspect, when a migrate command is executed, the file on GPFS may be replaced by a small stub file and the delta data will be moved to tape. From user point of view, the file appears to exit on GPFS even after migration. The file attributes and extended attributes may be the same. If a read/write operation is requested to a migrated file, a recall operation may be executed to move the data from tape to Flash/HDD.

However, the AFM system 400 may periodically send the difference data to the home 420 to synchronize the updates made at the cache 410. If the file is migrated at home 420, a recall occurs each time at home 420. A recall operation is required to find the tape in the library in the home 420 and a seek operation may be performed within the tape. After the data is read from the tape, the difference may be merged, and the final data may be stored on HDD/flash. The recall overhead becomes costly and inefficient in the order of minutes, particularly when files stored in multiple tapes are updated and the first file is recalled from the first tape, a second file recalled from second tape, and the third file recalled from the first tape, which is very inefficient. From the AFM system 400 point of view where the home 420 storage is extremely slow. Synchronizing of the files can fall behind the user operations and may result in errors.

Accordingly, the present invention seeks to prevent frequent occurrence of recall operations that can be induced when combining HSM storage and an application such as, for example, in an AFM that performs a large number of write operations on a plurality of migrated files in a short period of time. In one aspect, the present invention provides for preventing inefficient recalls in an HSM system by providing a write mode called "HSM-Buffered Write" mode to the HSM. For example, if a target file for a write operation is migrated, rather than recalling the data from a tape, the HSM system may save the delta (e.g., difference data) in a stub file. Upon a read request or a cleanup routine that is to be executed under a certain condition, the file data may be recalled from the tape and merged with the delta in the stub file. By using the HSM-Buffered write mode, when an application issues multiple writes to multiple migrated files, each of the following may occur. 1) Each write does not trigger a recall and completes in less time and more efficiently. 2) Later, the difference data (e.g., the delta data) in multiple stub files for multiple writes may be processed in a single bulk operation (e.g., processed all at once in a single operation), which allows for a resource-efficient recall and merging of the data. It should be noted that since AFM system 400 may continuously send a delta of data (e.g., changed data) to home 410, the AFM system 400 may also be used for data replication between sites.

Figure 5:
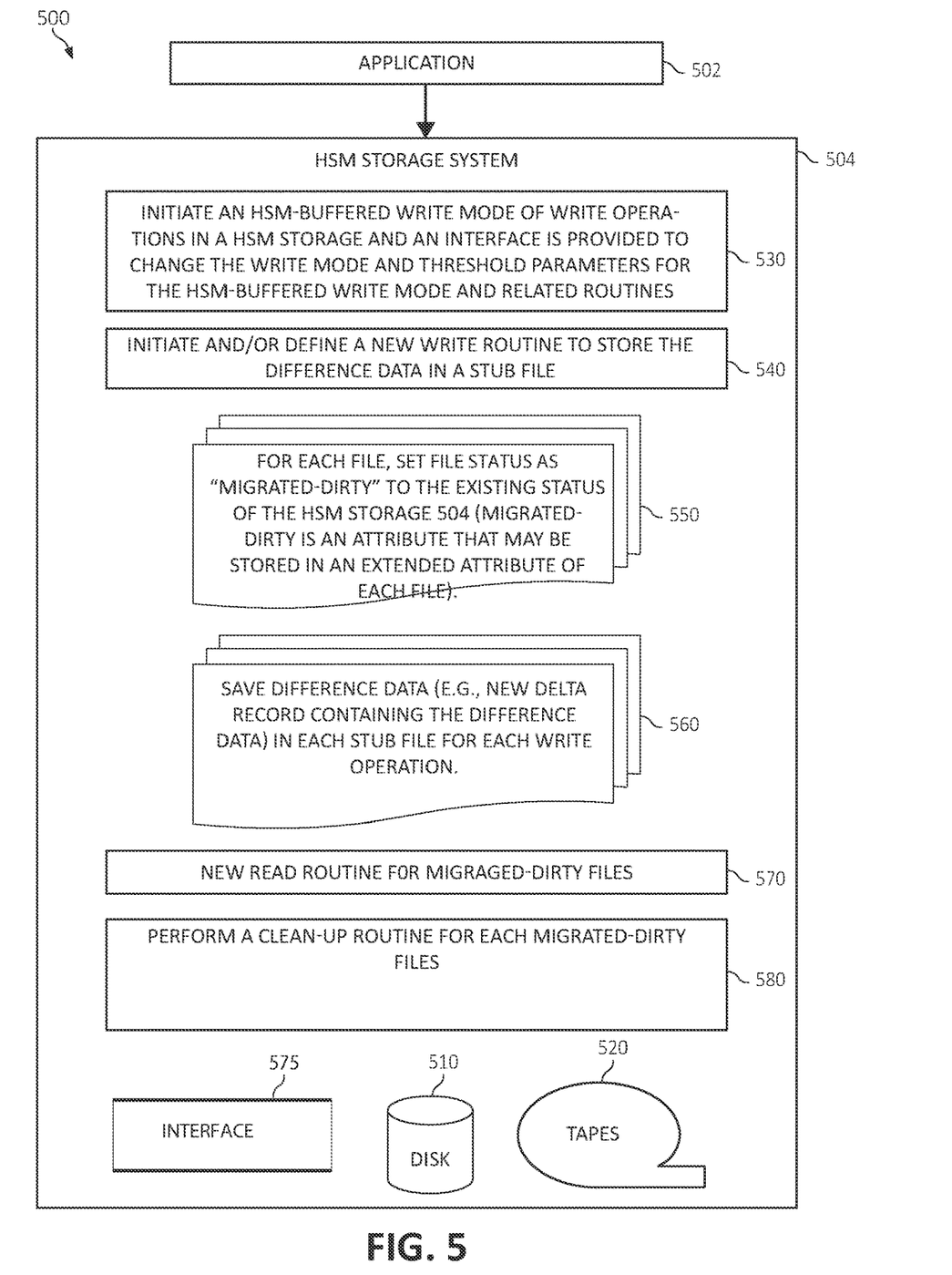
FIG. 5 is a block diagram depicting a hierarchical storage management (HSM) system for preventing inefficient recalls according to various aspects of the present invention.

Turning now to FIG. 5, a block flow diagram of an HSM system 500 for preventing inefficient recalls in an HSM system is depicted. As will be seen, many of the functional blocks may also be considered "modules" of functionality, in the same descriptive sense as has been previously described in FIGS. 1-4. Many of the functional blocks 400 may execute as background processes on various components, either in distributed computing components, or on the user device, or elsewhere, and generally unaware to the user performing generalized tasks of the present invention. Also, one or more aspects of FIGS. 1-4 may also be included with and/or implemented with FIG. 5.

As a preliminary matter, an HSM storage system 504 may be in communication with an application 502. In block 530, an HSM-buffered write mode for write operations may be initiated in the HSM storage 504 and an interface 575 is provided to change the write mode and threshold parameters for the HSM-buffered write mode and related routines. The interface may be an HSM storage system interface such as, for example, a command line interface ("CLI") command, application programming interface ("API"), configuration file or graphical user interface ("GUI"). The interface 575 may be used to control the mode (e.g., HSM-buffered write mode) or threshold parameters. A new write routine (e.g., the HSM-buffered write mode) may be initiated and/or defined to store the difference data in a stub file, as in block 540. That is, if HSM buffered write is enabled, the HSM buffered write will be initiated to store the delta in the stub file and set the migrated-dirty status. If HSM-buffered write mode is enabled, HSM buffered writes are issued in blocks 540 (blocks 550 and 560 below may be sub-blocks of block 540). Also, the stub file may be in a first tier (HDD/Flash storage).

For each file, a file status of "migrated-dirty" may be set (e.g., added to the existing status) of the HSM storage 504, as in block 550. The existing status may be defined as three states: 1) migrated, 2) pre-migrated, and 4) resident. However, upon activating the HSM-buffered write mode, the present invention provides an additional status (e.g., a 4th status) called "migrated-dirty." That is, the migrated-dirty is an attribute that may be stored in an extended attribute of each files. Difference data (e.g., new delta record containing the difference data) may be saved in each stub file for each write operation, as in block 560. A read routine may be performed for the migrated-dirty files (e.g., difference data file), as in block 570. A clean-up routine may be performed for each migrated-dirty files, as in block 580.

Without the HSM-buffered write mode, upon receipt of a write request on a migrated file, the HSM 504 performs a recall operation to place data on an HDD/Flash storage device and executes a write operation on the file data. That is, disks 510 may be the HDD/Flash storage. In contrast, using the HSM-buffered write mode, the HSM 504 1) saves the difference data in a stub file of the target file in the HDD/Flash storage device (e.g., the upper layer) and does not access a target file on a tape, and 2) sets the file status as "migrated-dirty" and completes the write operation.

After completion of the write operation, the target file remains in the tape and the difference data is added to the stub file. Because the HSM system 504 does not perform any recall operation and only performs a write operation of the difference data into the HDD/Flash storage device, the time to complete the write operation is significantly reduced.

It should be noted that the HSM system 504 manages file statuses of "resident," "re-migrated," and "migrated." However, the new/additional status "migrated-dirty" may be defined for files that have migrated and have difference data in corresponding respective stub files. This new/additional status "migrated-dirty" status may be stored/maintained in the same metadata area as the existing status, such as the extended attribute of the file.

The difference data stored in a stub file may be in a format equivalent to difference data of an AFM or a journal of another journal file system. The format may include the following items per record: 1) operation (e.g., operation that updates part of file data such as, for example, write and truncate operations), 2) offset (e.g., logical block addressing "LBA"), 3) Length (byte), and/or 4) data. The purpose of the difference data is to save a record representing difference from migrated file data. Thus, inode operations (e.g., create, delete, and rename) and a "Truncate 0" operation, which invalidates all the data of a file, are no longer required to be recorded. When the HSM system 504 receives from the application 502 a read request for a migrated-dirty file, the HSM system 504 recalls the file from a tape (e.g., tape 520) to an HDD/Flash storage device (e.g., disks 510), applies the difference data stored in the stub file in the disks 510 to the recalled file, modifies the file status to resident, and returns the final data to the application 502.

To switch the operation of the HSM system 504 between the HSM-Buffered Write mode and a standardized recall-write mode, a command and/or setting file for the mode switching per file system may be provided using interface 575 of FIG. 5. Furthermore, the HSM-Buffered Write mode may be made controllable per smaller unit (e.g., a GPFS file set, a directory, or a file).

In an additional aspect, the HSM system 504 may have a default value of an upper limit on the size of data that can be written to a stub file. The default value may be configurable via a setting file. That is, the setting file or a configuration file may be one of the interfaces of HSM storage system. Barious default values and tunable values are defined by using configuration files. The HSM system 504 (e.g., the IBM® Spectrum Scale®) may support selective recall so as efficiently read a plurality of files saved on tapes. The selective recall operation may execute a read operation while changing the order of files to be read so as to minimize the number of tape loading operations and the number of seek operations.

In an additional aspect, a cleanup operation may also be performed on the migrated-dirty files. For example, the cleanup operation may also be performed 1) when an amount of the difference data saved in a stub file exceeds a predetermined amount, 2) when a total sum of migrated-dirty files exceeds a predetermined number, or 3) at one or more selected times or time intervals. The cleanup operation may sort all the migrated-dirty files, execute recall operations on the files by performing a selective recall operation on the files en bloc so as to apply difference records saved in stub files to respective y files. The cleanup operation may also set the file status values/attributes of the migrated-dirty files to resident.

Moreover, an operation may be performed for listing all the migrated-dirty files and may use a command such as, for example, "mmapplypolicy" of IBM® Spectrum Scale®), which rapidly scans the attributes and extended attributes of all the files. Alternatively, the HSM system 504 may include and manage a list of migrated-dirty files. To clean-up all the existing migrated-dirty files, the HSM storage system needs to know which files are migrated-dirty and those files that are not migrated-dirty. The HSM sets the status by 1) scanning the files system and read the extended attribute of all the files and find out the dirty-migrated files. IBM Spectrum Scale has a command called mmapplypolicy which does the scan very quickly, and/or 2) maintaining a list of the dirty-migrated file.

In addition, from the perspective of an individual file, when the difference in each of the difference data records is small, a plurality of write requests may be reflected en bloc according to "HSM-Buffered Write" mode to the HSM. Theoretically, "small" may be less than half a cleanup threshold so that multiple writes can be done to a file before the cleanup occurs and may also depend on how much availability is in the upper layer and how much space can be provided for each stub file. In comparison with a case in which a conventional method (e.g., non HSM-buffered write mode) causes a file to migrate between write operations, the present invention enables reduction in occupation of resources due to eliminated migration and recall operations and also the amount of tape consumption to be reduced.

The HSM system 504 may also have a default value of one or more predetermined events (e.g., an amount of the difference data in each stub file, a total sum of migrated-dirty files, and/or time) for triggering a cleanup operation. The default value may be configurable via a setting file or the like.

In one aspect, the HSM-Buffered Write operation may include one or more advantages as follows. 1) A conventional write operation recalls data from a tape to the HDD/Flash device and overwrites the difference data on the data. In contrast, the HSM-Buffered Write operation only saves the difference data in a stub file in the HDD/Flash device and changes the file status to migrated-dirty. Thus, the write operation is rapidly completed and the current state of the file is of course readable with a read operation (e.g., rapidly completed because the time required to recall a file is saved).

For illustrating the ability to rapidly completed the operation using the HSM-Buffered Write operation the following comparison is provided. Conventionally (without using the HSM-Buffered Write operation), a library may 1) find a tape, load the tape to a tape drive, and seek to the position within the tape, which may take about 120-180 seconds depending on the library, drive, and tape. 2) The entire data of the original file is read from the tape. 3) The entire data of the original file is written to the HDD/flash. 4) The delta (e.g., difference data) is merged o the data on HDD/flash. 5) The file status is changed to resident. In contrast, the HSM-Buffered Write operation, 1) writes the delta to HDD/flash (e.g., upper layer) equal to or faster than step 4 above and 2) changes the file status to migrated-dirty equal to or faster step 5 above. Thus, for example the HSM-Buffered Write operation reduces the write time from about 120-180 seconds to about 1 second.

Also, a plurality of write requests on each file may be processed en bloc (e.g., all together or all at the same time. Thus, wasted resource consumption occurring for a write operation without use of the HSM-Buffered Write operation may be eliminated. Also, because an HSM performs a cleanup operation on migrated-dirty files en bloc, one or more selective recall operations to recall files from a tape efficiently.

It should be noted that a characteristic of the present invention due to the difference of the HSM-Buffered Write operation from a case in which the conventional write operation is used is that a read operation on a migrated-dirty file involves a recall operation and thus delays the response time of the read operation.

In view of the components of FIGS. 1-5, consider the following examples for preventing inefficient recalls in an HSM include an application that frequently sends difference per file like the AFM of a clustered file system (e.g., IBM® Spectrum Scale®) As previously mentioned, a use case of an AFM may include remote file sharing and file replication. In either case, a typical use case is that a user may execute a read/write operation on a cache site storage (e.g., cache 410 of FIG. 4) and AFM performs synchronization with a home site (e.g., home 420 of FIG. 4) in the background. For the synchronization, the AFM may send difference data to home site (e.g., home 420 of FIG. 4) to overwrite the difference data on a file stored in the home site (e.g., home 420 of FIG. 4). Conventionally, each time the AFM system sends the difference data, a recall operation takes place when the target file on a home has been migrated. In contrast, application of the present invention to the home site (e.g., home 420 of FIG. 4) enables a write operation to be instantly completed.

Also, regarding the slow responses to read operations on the home site (e.g., home 420 of FIG. 4), the AFM home is typically the backup replica storage. The read operations by customers are less frequently performed on files in the home site (e.g., home 420 of FIG. 4) especially when the HSM is installed and the files are migrated to tapes. Thus, the slow response time challenges are eliminated and/or reduced.

Figure 6:
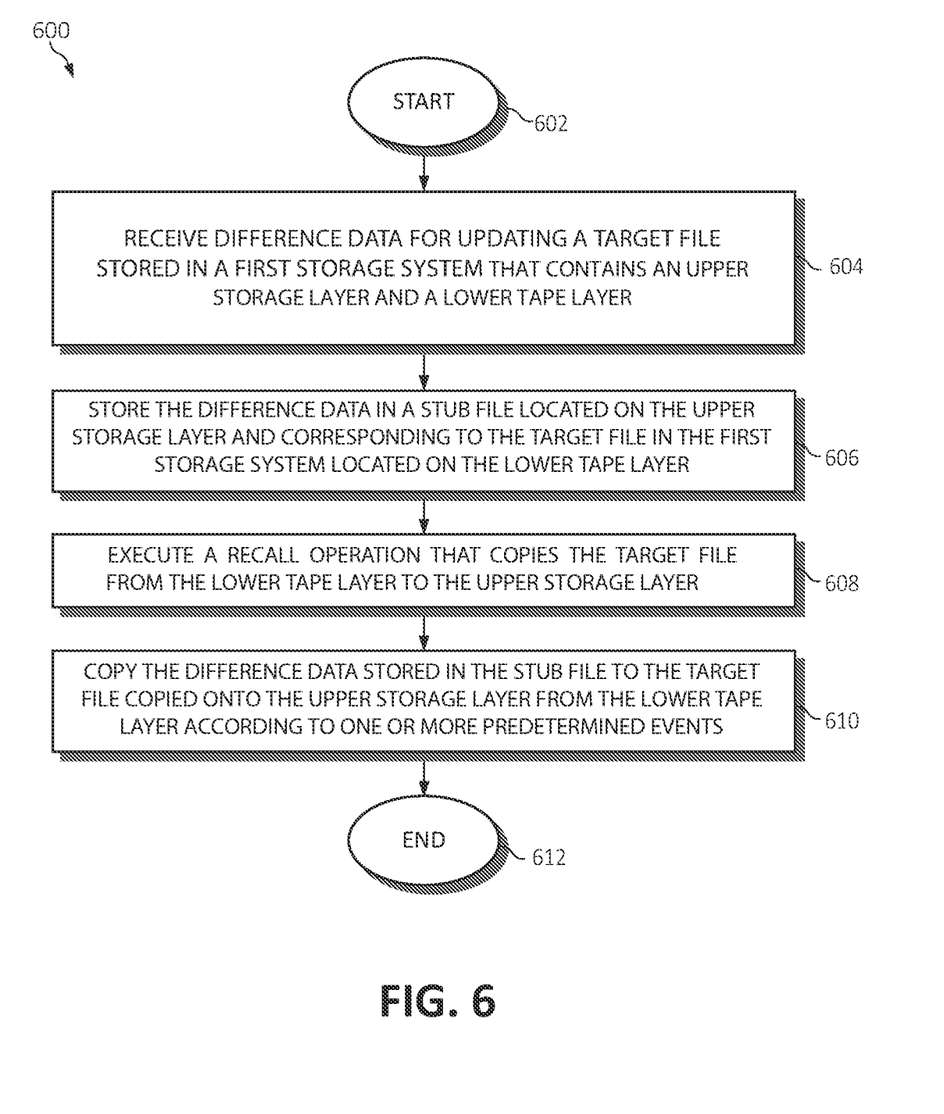
FIG. 6 is an additional flowchart diagram depicting an additional exemplary method for preventing inefficient recalls in a hierarchical storage management (HSM) system by a processor, again in which aspects of the present invention may be realized.

Turning now to FIG. 6, a method 600 for preventing inefficient recalls in an HSM using a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. In one aspect, the functionality, operations, and/or architectural designs of FIGS. 1-5 may be implemented all and/or in part in FIG. 6.

The functionality 600 may start in block 602. Difference data may be received for updating a target file stored in a first storage system that contains at least an upper storage layer and a lower tape layer, as in block 604, and is managed by HSM. The difference data may be stored in a stub file located on the upper storage layer and corresponding to the target file in the first storage system located on the lower tape layer, as in block 606. A recall operation may be executed that copies the target file from the lower tape layer to the upper storage layer, as in block 608. The difference data stored in the stub file may be copied to the target file copied onto the upper storage layer from the lower tape layer according to one or more predetermined events, as in block 610. The functionality 600 may end, as in block 612.

In one aspect, in conjunction with and/or as part of at least one block of FIG. 6, the operations of method 600 may include each of the following. The operations of method 600 may receive the difference data by the first storage system from a second storage system in response to a first file on the second storage system having been updated. The target file in the first storage system corresponds to the first file in the second storage system and the second storage system is connected to the first storage system via a network. The first storage system may be a logical replica of the second storage system. The predetermined events may be defined as an amount of the difference data saved in a stub file exceeding a predetermined amount or a total number of target files exceeds a predetermined number.

The operations of method 600 may assign a first attribute to the target file in the first storage system located on the lower tape layer; assign a second attribute to the target file in response to data having been stored in the stub file corresponding to the target file; and/or assign a third attribute to the target file upon completion of copying the difference data stored in the stub file to the target file copied onto the upper storage layer from the lower tape layer.

The operations of method 600 may copy the difference data stored in the stub file to the target file copied onto the upper storage layer from the lower tape layer upon the difference data exceeding a predetermined amount, at one or more selected time intervals, or a combination thereof, and/or copy, in a single bulk copy operation, difference data stored in a plurality of stub files to a plurality of target files copied onto the upper storage layer from the lower tape layer according to the one or more predetermined events. The operations of method 600 may merge file data of the target file with the difference data in the stub file for a read request or a clean-up operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for preventing inefficient recalls in a hierarchical storage management (HSM) system performed by a hardware processor executing computer program instructions stored in a computer memory, comprising:
receiving difference data for updating a target file stored in a first storage system having at least an upper storage layer and a lower tape layer;
storing difference data in a stub file located on the upper storage layer and corresponding to the target file in the first storage system located on the lower tape layer;
executing a recall operation that copies the target file from the lower tape layer to the upper storage layer;
copying the difference data stored in the stub file to the target file copied onto the upper storage layer from the lower tape layer according to one or more predetermined events; and
merging file data of the target file with the difference data in the stub file for a read request or a clean-up operation.

2. The method of claim 1, further including receiving the difference data by the first storage system from a second storage system in response to a first file on the second storage system having been updated, wherein the target file in the first storage system corresponds to the first file in the second storage system and the second storage system is connected to the first storage system via a network, wherein the first storage system is a logical replica of the second storage system.

3. The method of claim 1, further including:
assigning a first attribute to the target file in the first storage system located on the lower tape layer;
assigning a second attribute to the target file in response to data having been stored in the stub file corresponding to the target file; or
assigning a third attribute to the target file upon completion of copying the difference data stored in the stub file to the target file copied onto the upper storage layer from the lower tape layer.

4. The method of claim 1, further including defining the predetermined events as an amount of the difference data saved in the stub file exceeding a predetermined amount or a total number of target files exceeds a predetermined number.

5. The method of claim 1, further including copying the difference data stored in the stub file to the target file copied onto the upper storage layer from the lower tape layer upon the difference data exceeding a predetermined amount, at one or more selected time intervals, or a combination thereof.

6. The method of claim 1, further including copying, in a single bulk copy operation, difference data stored in a plurality of stub files to a plurality of target files copied onto the upper storage layer from the lower tape layer according to the one or more predetermined events.

7. A system for preventing inefficient recalls in a hierarchical storage management (HSM) system, comprising:
one or more hardware processors; and
computer memory holding computer program instructions executed by the one or more hardware processors and operative to:
receive difference data for updating a target file stored in a first storage system having at least an upper storage layer and a lower tape layer;
store the difference data in a stub file located on the upper storage layer and corresponding to the target file in the first storage system located on the lower tape layer;
execute a recall operation that copies the target file from the lower tape layer to the upper storage layer;
copy the difference data stored in the stub file to the target file copied onto the upper storage layer from the lower tape layer according to one or more predetermined events; and merge file data of the target file with the difference data in the stub file for a read request or a clean-up operation.

8. The system of claim 7, wherein the computer program instructions, when executed by the one or more hardware processors, are further operative to receive the difference data by the first storage system from a second storage system in response to a first file on the second storage system having been updated, wherein the target file in the first storage system corresponds to the first file in the second storage system and the second storage system is connected to the first storage system via a network, wherein the first storage system is a logical replica of the second storage system.

9. The system of claim 7, wherein the computer program instructions, when executed by the one or more hardware processors, are further operative to:
assign a first attribute to the target file in the first storage system located on the lower tape layer;
assign a second attribute to the target file in response to data having been stored in the stub file corresponding to the target file; or
assign a third attribute to the target file upon completion of copying the difference data stored in the stub file to the target file copied onto the upper storage layer from the lower tape layer.

10. The system of claim 7, wherein the computer program instructions, when executed by the one or more hardware processors, are further operative to define the predetermined events as an amount of the difference data saved in the stub file exceeding a predetermined amount or a total number of target files exceeds a predetermined number.

11. The system of claim 7, wherein the computer program instructions, when executed by the one or more hardware processors, are further operative to copy the difference data stored in the stub file to the target file copied onto the upper storage layer from the lower tape layer upon the difference data exceeding a predetermined amount, at one or more selected time intervals, or a combination thereof.

12. The system of claim 7, wherein the computer program instructions, when executed by the one or more hardware processors, are further operative to copy, in a single bulk copy operation, difference data stored in a plurality of stub files to a plurality of target files copied onto the upper storage layer from the lower tape layer according to the one or more predetermined events.

13. A computer program product for preventing inefficient recalls in a hierarchical storage management (HSM) system, the computer program product comprising a non-transitory computer-readable storage medium holding computer program instructions executed by a hardware processor and operative to:
receive difference data for updating a target file stored in a first storage system having at least an upper storage layer and a lower tape layer;
store the difference data in a stub file located on the upper storage layer and corresponding to the target file in the first storage system located on the lower tape layer;
execute a recall operation that copies the target file from the lower tape layer to the upper storage layer;
copy the difference data stored in the stub file to the target file copied onto the upper storage layer from the lower tape layer according to one or more predetermined events; and
merge file data of the target file with the difference data in the stub file for a read request or a clean-up operation.

14. The computer program product of claim 13, wherein the computer program instructions executed by the hardware processor are further operative to receive the difference data by the first storage system from a second storage system in response to a first file on the second storage system having been updated, wherein the target file in the first storage system corresponds to the first file in the second storage system and the second storage system is connected to the first storage system via a network, wherein the first storage system is a logical replica of the second storage system.

15. The computer program product of claim 13, wherein the computer program instructions executed by the hardware processor are further operative to:
assign a first attribute to the target file in the first storage system located on the lower tape layer;
assign a second attribute to the target file in response to data having been stored in the stub file corresponding to the target file; or
assign a third attribute to the target file upon completion of copying the difference data stored in the stub file to the target file copied onto the upper storage layer from the lower tape layer.

16. The computer program product of claim 13, wherein the computer program instructions executed by the hardware processor are further operative to define the predetermined events as an amount of the difference data saved in the stub file exceeding a predetermined amount or a total number of target files exceeds a predetermined number.

17. The computer program product of claim 13, wherein the computer program instructions executed by the hardware processor are further operative to:
copy the difference data stored in the stub file to the target file copied onto the upper storage layer from the lower tape layer upon the difference data exceeding a predetermined amount, at one or more selected time intervals, or a combination thereof; or
copy, in a single bulk copy operation, difference data stored in a plurality of stub files to a plurality of target files copied onto the upper storage layer from the lower tape layer according to the one or more predetermined events.

* * * * *